United States Patent
Hata et al.

(10) Patent No.: US 9,834,203 B2
(45) Date of Patent: Dec. 5, 2017

(54) VEHICLE CONTROL SYSTEM

(71) Applicant: Toyota Jidosha Kabushiki Kaisha, Toyota-shi, Aichi-ken (JP)

(72) Inventors: Kensei Hata, Okazaki (JP); Yuji Iwase, Toyota (JP); Yosuke Suzuki, Seto (JP); Koichi Kato, Okazaki (JP); Seitaro Nobuyasu, Okazaki (JP); Taro Moteki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/024,921

(22) PCT Filed: Jul. 31, 2014

(86) PCT No.: PCT/JP2014/071128
§ 371 (c)(1),
(2) Date: Mar. 25, 2016

(87) PCT Pub. No.: WO2015/045651
PCT Pub. Date: Apr. 2, 2015

(65) Prior Publication Data
US 2016/0257300 A1    Sep. 8, 2016

(30) Foreign Application Priority Data

Sep. 27, 2013 (JP) ................. 2013-200760

(51) Int. Cl.
*B60K 6/442*    (2007.10)
*B60W 10/02*    (2006.01)
*B60W 10/08*    (2006.01)
*B60W 10/06*    (2006.01)
*B60W 20/40*    (2016.01)
*B60K 6/48*    (2007.10)
*F16D 48/10*    (2006.01)

(52) U.S. Cl.
CPC ............ *B60W 20/40* (2013.01); *B60K 6/442* (2013.01); *B60K 6/48* (2013.01); *B60W 10/02* (2013.01);
(Continued)

(58) Field of Classification Search
CPC ...... B60W 20/40; B60W 10/02; B60W 10/06; B60W 10/08; B60W 2510/0208;
(Continued)

(56) References Cited

U.S. PATENT DOCUMENTS

| 5,788,006 A | 8/1998 | Yamaguchi |
| 2004/0134698 A1* | 7/2004 | Yamamoto ............... B60K 6/44 180/65.225 |

(Continued)

FOREIGN PATENT DOCUMENTS

| DE | 102006048358 A1 | 4/2008 | |
| EP | 1132271 A2 * | 9/2001 | ............. B60T 8/172 |

(Continued)

*Primary Examiner* — Tuan C To
(74) *Attorney, Agent, or Firm* — Dinsmore & Shohl LLP

(57) ABSTRACT

A vehicle control system for preventing malfunction of the clutch for selectively connecting the engine with the power train. The vehicle control system is applied to a vehicle having an engine, a motor disposed on a power train, and a clutch interposed therebetween. In order to prevent a malfunction of the clutch, the vehicle control system is configured to engage the clutch while causing a slip but without starting the engine if the engine has not yet been started.

9 Claims, 5 Drawing Sheets

(52) U.S. Cl.
CPC ............ *B60W 10/06* (2013.01); *B60W 10/08* (2013.01); *F16D 48/10* (2013.01); *B60W 2510/0208* (2013.01); *B60W 2510/0258* (2013.01); *B60W 2510/0275* (2013.01); *B60W 2510/082* (2013.01); *B60W 2510/083* (2013.01); *B60W 2710/025* (2013.01); *B60W 2710/06* (2013.01); *B60W 2710/08* (2013.01); *B60Y 2200/92* (2013.01); *B60Y 2300/182* (2013.01); *B60Y 2300/42* (2013.01); *B60Y 2300/43* (2013.01); *B60Y 2300/60* (2013.01); *F16D 2500/10412* (2013.01); *F16D 2500/3065* (2013.01); *F16D 2500/30402* (2013.01); *F16D 2500/50858* (2013.01); *F16D 2500/5124* (2013.01); *F16D 2500/70426* (2013.01); *Y10S 903/93* (2013.01)

(58) Field of Classification Search
CPC . B60W 2510/0258; B60W 2510/0275; B60W 2510/082; B60W 2510/083; B60W 2710/025; B60W 2710/06; B60W 2710/08; B60W 2200/92; B60W 2300/182; B60W 2300/42; B60W 2300/43; B60Y 2200/92; B60Y 2300/42; B60Y 2300/43; B60Y 2300/60; F16D 48/10; F16D 2500/10412; F16D 2500/30402; F16D 2500/3065; F16D 2500/50858; F16D 2500/5124; F16D 2500/70426; Y10S 903/93
See application file for complete search history.

(56) References Cited

U.S. PATENT DOCUMENTS

| | | | | |
|---|---|---|---|---|
| 2007/0102207 | A1* | 5/2007 | Yamanaka | B60K 6/48 180/65.31 |
| 2009/0011899 | A1 | 1/2009 | Reuschel | |
| 2009/0143950 | A1* | 6/2009 | Hasegawa | B60K 6/48 701/68 |
| 2009/0234524 | A1* | 9/2009 | Kim | B60K 6/48 701/22 |
| 2010/0056328 | A1 | 3/2010 | Schenk et al. | |
| 2011/0118915 | A1* | 5/2011 | Ortmann | B60K 6/48 701/22 |
| 2011/0320076 | A1* | 12/2011 | Shin | B60K 6/48 701/22 |
| 2013/0184921 | A1* | 7/2013 | Ueno | B60L 11/14 701/22 |
| 2013/0267378 | A1* | 10/2013 | Hiraiwa | B60W 20/00 477/5 |
| 2013/0274980 | A1* | 10/2013 | Takamura | B60K 6/48 701/22 |
| 2013/0296108 | A1* | 11/2013 | Ortmann | B60K 6/383 477/5 |
| 2013/0296116 | A1* | 11/2013 | Dai | B60W 10/06 477/5 |
| 2013/0297128 | A1* | 11/2013 | Takamura | B60K 6/48 701/22 |
| 2013/0297136 | A1* | 11/2013 | Yamanaka | B60K 6/48 701/22 |
| 2014/0121873 | A1* | 5/2014 | Choi, II | B60K 6/48 701/22 |
| 2014/0142821 | A1* | 5/2014 | Heap | B60W 10/10 701/54 |

FOREIGN PATENT DOCUMENTS

| | | | | |
|---|---|---|---|---|
| EP | 1529703 | A1 * | 5/2005 | .............. B60T 8/172 |
| EP | 2008899 | A1 | 12/2008 | |
| JP | H05180330 | A | 7/1993 | |
| JP | H06307471 | A | 11/1994 | |
| JP | H08295140 | A | 11/1996 | |
| JP | 2010-505697 | A | 2/2010 | |
| JP | 2010-144851 | A | 7/2010 | |
| JP | 2013-071630 | A | 4/2013 | |

* cited by examiner

[Fig. 1]
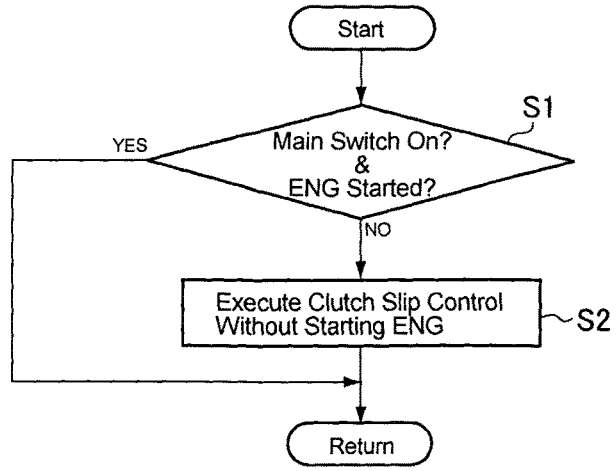
[Fig. 2]
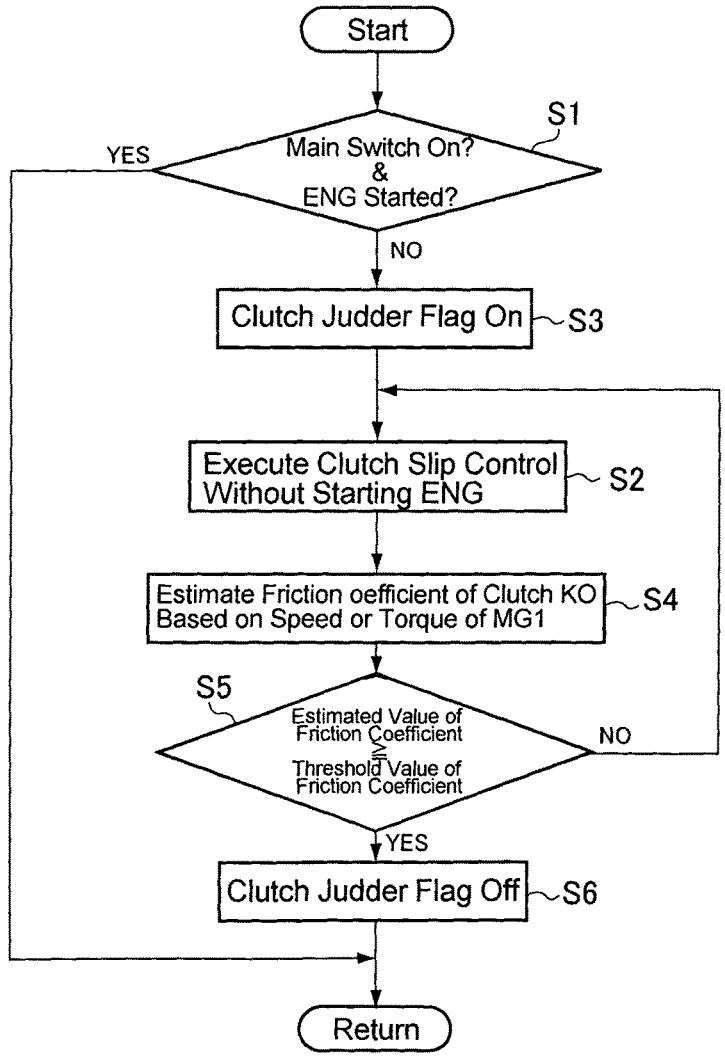

[Fig. 3]
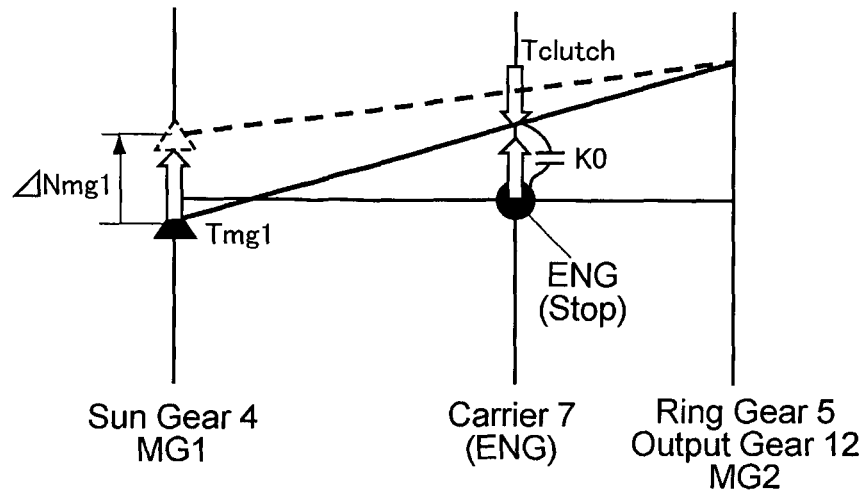
[Fig. 4]
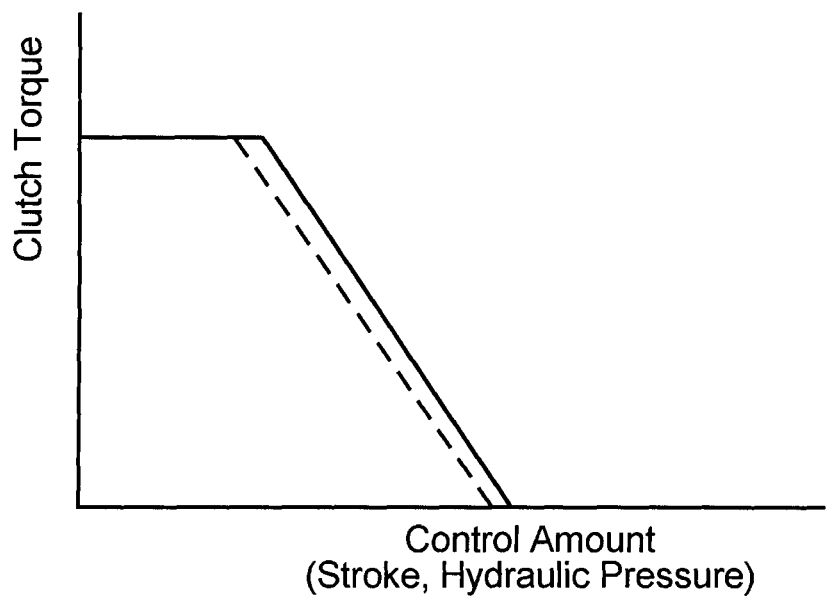

[Fig. 5]
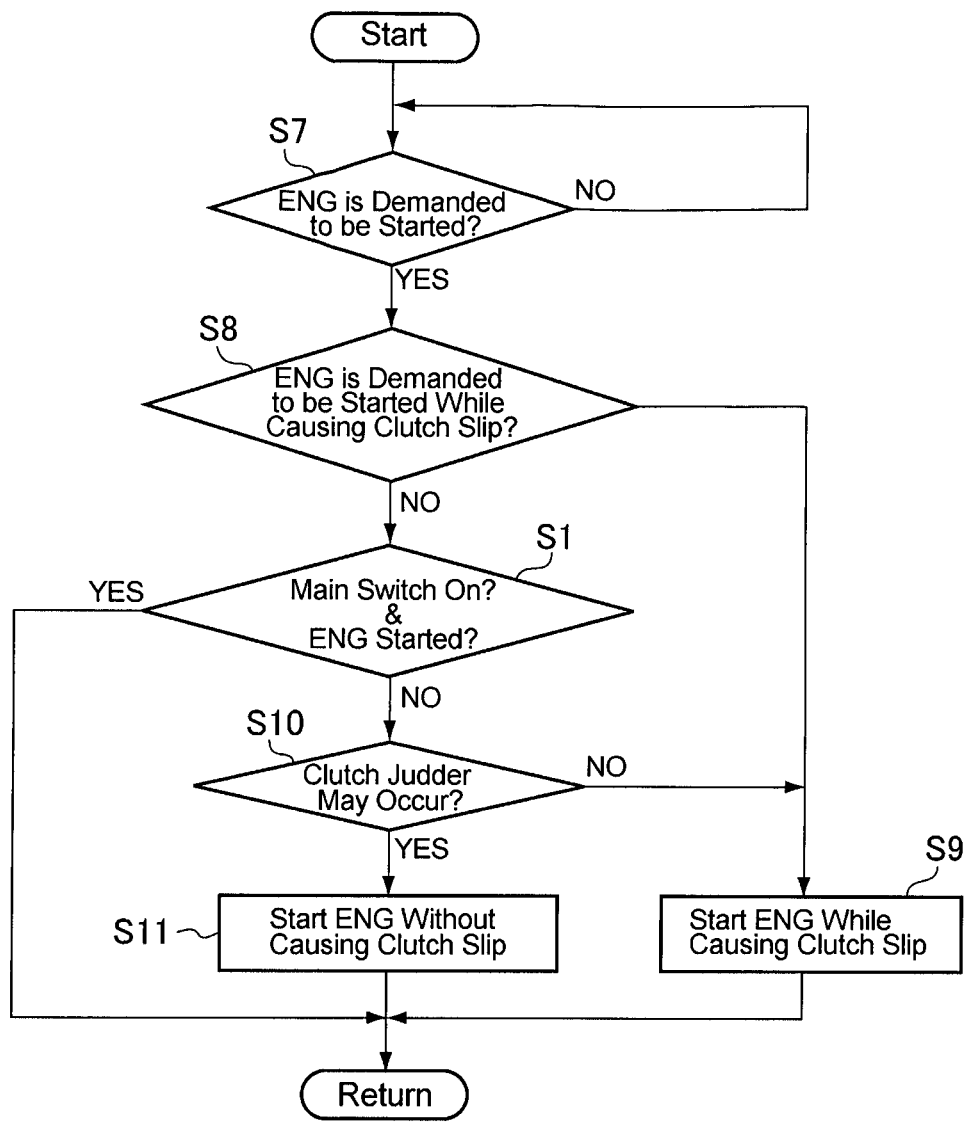

[Fig. 6]
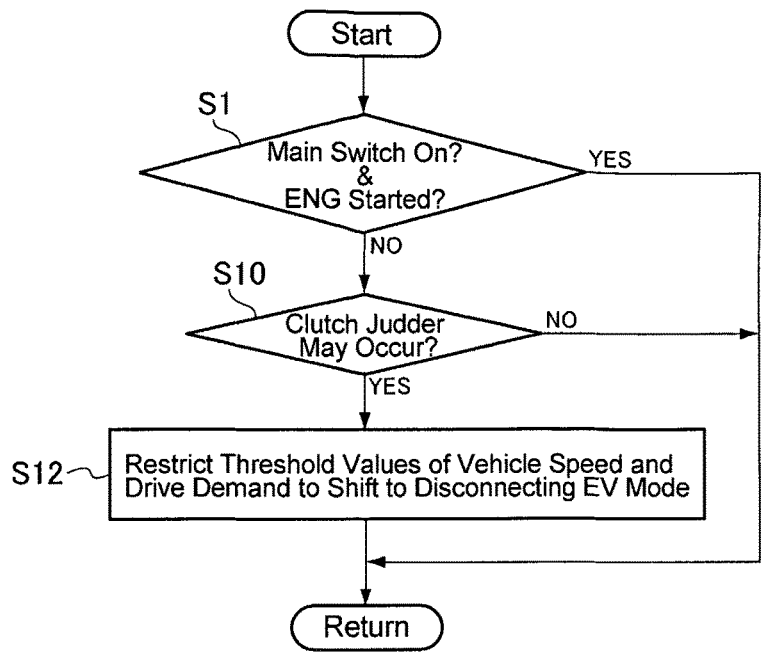
[Fig. 7]
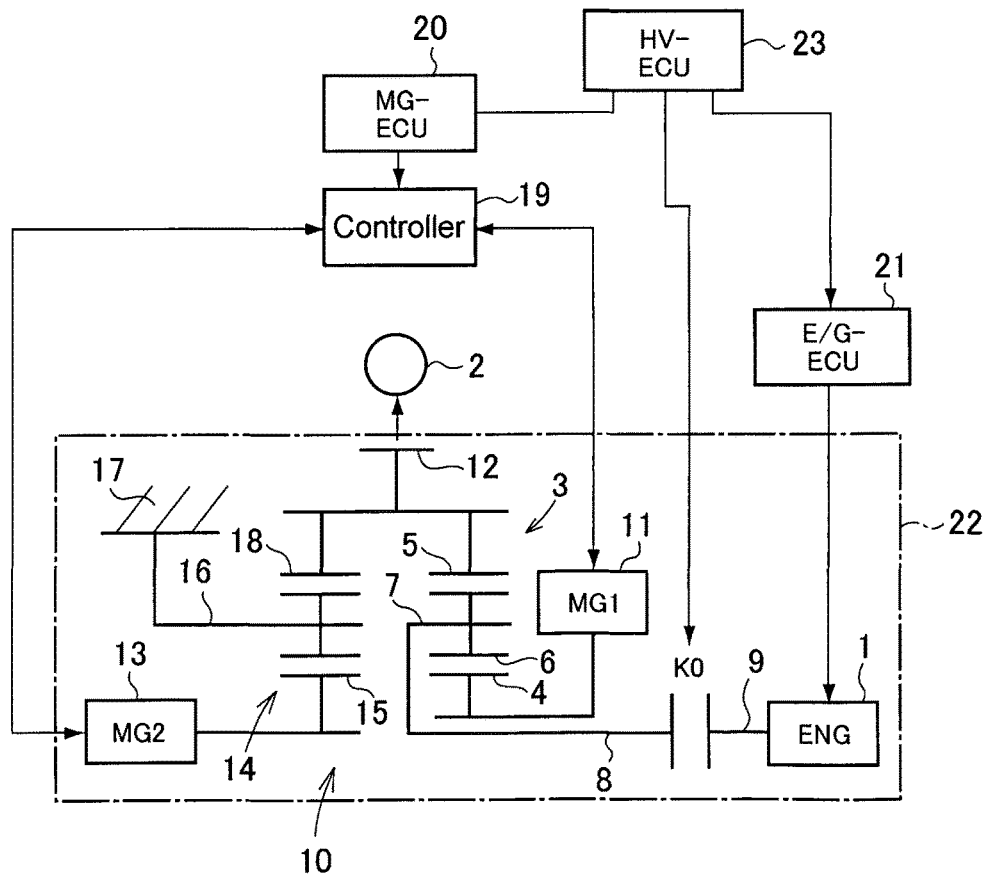

[Fig. 8]
[Fig. 9]
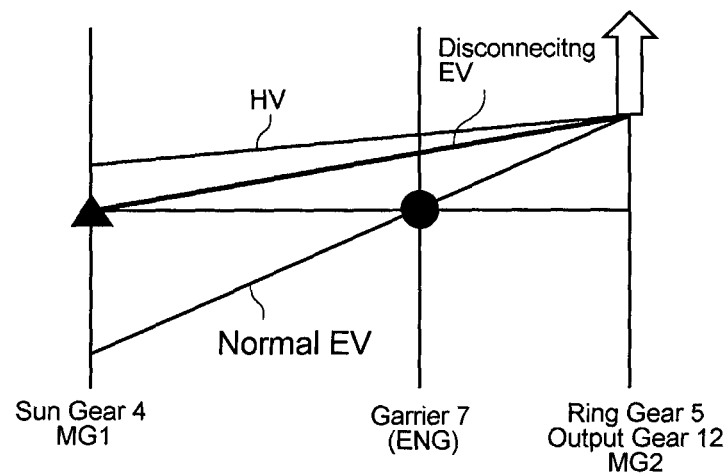

VEHICLE CONTROL SYSTEM

CROSS-REFERENCE TO RELATED APPLICATIONS

The present application is a national stage of international application PCT/JP2014/071128 filed Jul. 31, 2014, which claims priority to JP 2013-200760 filed Sep. 27, 2013, the entire contents of which are hereby incorporated by reference.

TECHNICAL FIELD

The present disclosure relates to a control system for a vehicle having a clutch adapted to gradually change torque transmitting capacity thereof and to selectively disconnect an engine from a power train.

BACKGROUND ART

An example of the vehicle of this kind is disclosed in Japanese Patent Laid-Open No. 08-295140. According to the teachings of Japanese Patent Laid-Open No. 08-295140, the first gear element of the differential gear unit is coupled to the generator, the second gear element is coupled to the motor to serves as the output element, and the third gear element is coupled to the breaking means. The third gear element is also coupled to the engine via the clutch. Thus, the engine is allowed to be disconnected from the third gear element by disengaging the clutch. Therefore, when driving the vehicle by the power outputted from the motor and the engine, the engine is allowed not only to be rotated but also stopped.

In turn, Japanese Patent Laid-Open No. 2010-144851 also discloses a hybrid vehicle in which the engine is connected with the motor-generator through the first clutch, and the motor-generator is connected with the automatic transmission through the second clutch. According to the teachings of Japanese Patent Laid-Open No. 2010-144851, the torque transmitting capacity of the second clutch is controlled by allowing the second clutch to slip thereby achieving a demanded driving torque when the vehicle is stopping or running at a low speed. In addition, if the thermal load on the slipping second clutch is large under the situation that the vehicle is driven by the torques of the engine and the motor-generator by engaging the first clutch, slip amount of the second clutch is reduced to suppress temperature rise of the second clutch.

A driving mode of the vehicle can be diversified into a plurality of different modes by thus interposing the clutch between the engine and the motor as taught by Japanese Patent Laid-Opens Nos. 08-295140 and 2010-144851. However, if a friction surface of the clutch is partially moisturized, friction coefficient of the moisture portion becomes lower than that of the remaining portion. As a result, friction coefficient of the friction surface becomes uneven, and clutch judder may be caused if the clutch is engaged. In this situation, a clutch torque may be varied to generate a torque pulse or shocks thereby worsening noise and vibrations (i.e., NVH characteristics). In turn, if the thermal load on the clutch is increased excessively as a result of slipping the clutch, durability of the clutch may be deteriorated and the friction coefficient is reduced. As a result, the clutch judder may be caused.

SUMMARY

The present disclosure has been conceived noting the foregoing technical problems, and it is an object of the present disclosure to provide a vehicle control system for preventing a malfunction of the clutch adapted to disconnect the engine selectively from the power train.

The vehicle control system of the present disclosure is applied to a vehicle comprised of an engine, a motor disposed on a power train, and a clutch for selectively connecting the engine with the power train that is adapted to cause a slip when engaged. In order to solve the foregoing technical problems, the vehicle control system of the present disclosure is configured to engage the clutch while causing a slip but without starting the engine provided that the engine is not activated.

Specifically, the vehicle control system may be configured to engage the clutch while causing a slip but without starting the engine provided that the vehicle is driven by a torque of an output torque of the motor and the engine is not activated.

The vehicle control system may also be configured to engage the clutch while causing a slip but without starting the engine provided that a friction coefficient of the clutch is smaller than a predetermined value and the engine is not activated.

In addition, the vehicle control system of the present disclosure is configured to estimate a friction coefficient of the clutch when increasing a rotational speed of the engine by a torque of the motor transmitted thereto through the clutch being engaged while causing a slip. In order to estimate the friction coefficient of the clutch, specifically, the vehicle control system estimates a torque transmitting capacity of the clutch being engaged while causing a slip based on an output torque of the motor, and each change rate of rotational speed of the motor and rotational speed inputted to the clutch from the motor changed as a result of engaging the clutch while causing a slip. Then, the friction coefficient of the clutch is estimated based on the estimated value of the torque transmitting capacity of the clutch, and a control amount of the clutch to engage the clutch while causing a slip.

Further, the vehicle control system of the present disclosure is configured to select an electric vehicle mode in which the vehicle is driven by a torque of the motor while disengaging the clutch in case a vehicle speed and a drive demand are smaller than predetermined threshold values. To this end, the control system lowers a threshold value of the vehicle speed and a threshold value of the demanded driving force in case the friction coefficient of the clutch is equal to or smaller than the predetermined value thereby altering a border to shift a driving mode of the vehicle to the electric vehicle mode.

Thus, according to the present disclosure, the clutch is caused to slip under the condition that the engine has not yet started. Therefore, if a friction surface of the clutch is moistened or rusty, such moisture or rust can be eliminated from the friction surface by thus causing the clutch to slip. Consequently, an occurrence of clutch judder can be avoided when engaging the clutch. For this reason, the clutch torque will not be varied provided that the clutch is engaged so that the noise and vibration, that is, the NVH characteristics will not be deteriorated. Moreover, according to the present disclosure, the engine will not be started even if the rotational speed of the engine is raised by the torque of the motor transmitted thereto through the slipping clutch. Therefore, variation in torque and shocks will not be caused by starting the engine. In addition, since the engine will not be started when the clutch is caused to slip, it is unnecessary to raise the rotational speed of the engine to the ignition speed. Therefore, a load on the motor can be lightened.

Specifically, the slip control of the clutch is carried out under the condition that the vehicle is allowed to driven by the torque of the motor and the engine has not yet been started. Therefore, the moisture or the rust as a cause for the clutch judder can be eliminated from the friction surface of the clutch before starting the engine. For example, even if a dew condensation occurs in the clutch during parking the vehicle, so-called morning judder can be avoided by thus carrying out the clutch slip control.

Friction coefficient of the friction surface at the moistened portion or the rusted portion is degraded in comparison with that at the remaining portion. Therefore, if the friction surface of the clutch is partially moistened or get rusted, the friction coefficient of the friction surface is degraded entirely. That is, the clutch judder tends to take place in this situation. However, according to the present disclosure, the above-explained clutch slip control is carried out to avoid the clutch judder if the friction coefficient of the friction surface of the clutch is smaller than the predetermined threshold value.

According to the present disclosure, the torque being transmitted through the clutch is estimated during slipping the clutch. That is, the estimation value of the torque transmitted through the slipping clutch is calculated using an inertia torque as a factor. Therefore, the torque transmitting capacity of the slipping clutch can be estimated accurately. The torque transmitting capacity of the slipping clutch thus estimated is used to estimate the friction coefficient of the clutch with respect to the control amount. Therefore, the friction coefficient of the friction surface of the clutch can be estimated accurately.

If the slip control of the clutch is carried out under the condition that the friction coefficient of the clutch is lower than the threshold value, the clutch judder may be caused. In order to avoid such a disadvantage, according to the present disclosure, the threshold values of the vehicle speed and the demand driving force to drive the vehicle under the EV mode are lowered in case the friction coefficient of the clutch is smaller than the threshold value. Under the EV mode, the vehicle is driven by the output torque of the motor while disengaging the clutch. However, the region where the EV mode is selected is thus restricted if the friction coefficient of the clutch is lower than the threshold value. That is, in this case, the vehicle is driven while engaging the clutch in most situations. Therefore, the clutch judder and abrasion of the clutch resulting from engaging the clutch can be reduced. In this case, moreover, the engine is allowed to be started promptly when demanded to accelerate the vehicle, and the engine torque can be transmitted to the driving wheels quickly. In addition, the moment of inertia of the power train is increased by thus connecting the engine thereto so that noise and vibrations are reduced.

BRIEF DESCRIPTION OF THE DRAWINGS

FIG. 1 is a flowchart showing one example of the control to be carried out by the control system of the present disclosure.

FIG. 2 is a flowchart showing another example of the control to be carried out by the control system of the present disclosure.

FIG. 3 is a nomographic diagram showing an operating state where a motoring of the engine is carried out by the first motor-generator.

FIG. 4 shows one example of a map determining a relation between the torque and operating amount of the clutch.

FIG. 5 is a flowchart showing still another example of the control to be carried out by the control system of the present disclosure.

FIG. 6 is a flowchart showing still another example of the control to be carried out by the control system of the present disclosure.

FIG. 7 is a skeleton diagram showing one example of a structure of the vehicle to which the control system of the present disclosure is applied.

FIG. 8 is a table showing an engagement status of the clutch under each driving mode.

FIG. 9 is a nomographic diagram showing an operating state under each driving mode.

DETAILED DESCRIPTION

The vehicle control system of the present disclosure is applied to a vehicle having a clutch for selectively disconnecting the engine from the power train. For this purpose, the clutch is adapted to be engaged while changing a torque transmitting capacity gradually.

An example of a power train of the vehicle to which the present disclosure is applied is illustrated in FIG. 7. In the vehicle shown in FIG. 7, the power of the engine (ENG) 1 is partially transmitted to the driving wheels 2 by a mechanical connection. Remaining power of the engine 1 is once converted into an electric power, and then converted into a mechanical power again to be transmitted to the driving wheels 2. In order to distribute the power of the engine 1, a power distribution device 3 is disposed on the power train 10. As the conventional two-motor type hybrid drive units, a single-pinion type planetary gear unit adapted to perform a differential action using three rotary elements is used as the power distribution device 3. Specifically, the power distribution device 3 is comprised of: a sun gear 4; a ring gear 5 arranged concentrically with the sun gear 4; a pinion gear 6 meshing with both the sun gear 4 and the ring gear 5; and a carrier 7 holding the pinion gear 6 in a manner such that the pinion gear 6 is allowed to rotate and revolve around the sun gear 4.

Specifically, the carrier 7 is connected with an input shaft 8 to serve as an input element. A clutch K0 is disposed between the input shaft 8 and an output shaft (i.e., a crankshaft) 9 of the engine 1. The clutch K0 is adapted to selectively connect and disconnect the engine 1 to/from the power distribution device 3 disposed on the power train 10. For this purpose, a friction clutch adapted to be engaged gradually is used as the clutch K0. Therefore, a torque transmitting capacity of the clutch K0 is changed gradually from a completely disengaged state until being engaged completely without causing a slip. For example, any of conventional dry-type clutch, wet type-clutch, single plate-type clutch, and multiple plate-type clutch may be used as the clutch K0. In addition, both hydraulic actuator and an electromagnetic actuator may be used to actuate the clutch K0. Provided that a conventional single plate-type dry clutch is employed as the clutch K0, the clutch K0 is kept to be engaged by a returning device such as a diaphragm spring when the actuator is not activated. That is, torque transmitting capacity of the clutch K0 is changed in proportion to a stroke of the actuator changed in accordance with a hydraulic pressure or a current applied thereto. Such relation between the torque transmitting capacity of the clutch K0 and the stroke of the actuator is preinstalled in the form of map. Here, if the friction coefficient of the friction surface of the clutch K0 is changed for some reason, the torque transmitting capacity of the clutch K0 with respect to a predetermined stroke will be changed.

The sun gear 4 is connected with the first motor-generator (MG1) 11 to serve as a reaction element. In some embodiments, a permanent magnet synchronous motor having a generating function is used as the first motor-generator 11. The ring gear 5 as the output element is integrated with the output gear 12 to output a driving force to the driving wheels 2. Here, although not especially shown in FIG. 7, the vehicle illustrated therein is provided with a conventional differential gear unit, a drive shaft and so on to transmit the torque from the output gear 12 to the driving wheels 2.

The engine 1, the power distribution device 3 and the first motor-generator 11 are arranged on a common axis, and the second motor-generator (MG2) 13 is arranged coaxially therewith but separated. The second motor-generator 13 is also a permanent magnet synchronous motor that is adapted not only to generate a driving force but also to regenerate energy, and connected with the aforementioned output gear 12 through a speed reduction device 14. Specifically, a single-pinion type planetary gear unit is also used as the speed reduction device 14, and as shown in FIG. 7, a sun gear 15 is connected with the second motor-generator 13, a carrier 16 is fixed to a stationary portion 17 such as a housing, and a ring gear 18 is integrated with the output gear 12.

Those motor-generators 11 and 13 are electrically connected with a controller 19 comprising an electric storage device and an inverter. In order to control the controller 19, an electric control unit (as will be called MG-ECU hereinafter) 20 is connected to the controller 19. The MG-ECU 20 is composed mainly of a microcomputer configured to carry out a calculation based on preinstalled data and data or command signal to be inputted thereto, and to output a calculation result to the controller 19 in the form of a command signal. Accordingly, the motor-generators 11 and 13 are operated as the motor or generator depending on the command signal from the controller 19, and torques thereof are also controlled by the controller 19.

The engine 1 is started and stopped electrically. Specifically, provided that the engine 1 is a gasoline engine, an opening degree of a throttle valve, a feeding amount of fuel, a cessation of fuel delivery, an execution, a cessation and a timing of ignition etc. are controlled electrically. For this purpose, another electronic control unit (as will be called E/G-ECU hereinafter) 21 is connected with the engine 1. The E/G-ECU 21 is also composed mainly of a microcomputer configured to carry out a calculation based on preinstalled data and data or command signal to be inputted thereto, and to output a calculation result to the engine 1 in the form of a command signal.

Thus, a prime mover 22 is comprised of the engine 1, the motor-generators 11 and 13, the clutch K0 and the power distribution device 3, and still another electronic control unit (as will be called HV-ECU hereinafter) 23 is provided to control the prime mover 22. The HV-ECU 23 is also composed mainly of a microcomputer configured to carry out after-explained controls by sending command signals to the MG-ECU 20 and the E/G-ECU 21.

A driving mode of the vehicle shown in FIG. 7 is selected from hybrid mode (abbreviated as HV mode) in which the vehicle is driven by the power of the engine 1, and electric vehicle mode (abbreviated as EV mode) in which the vehicle is driven by the electric power. Specifically, the EV mode can be selected from disconnecting EV mode in which the engine 1 is disconnected from the power train 10, and normal EV mode in which the engine 1 is connected with the power train 10. FIG. 8 is a table showing an engagement status of the clutch K0 under each driving mode. As can be seen from FIG. 8, the clutch K0 is disengaged under the disconnecting EV mode. In contrast, the clutch K0 is engaged under the normal EV mode and the HV mode. Specifically, the driving mode of the vehicle is selected from the HV mode, the disconnecting EV mode and the normal EV mode, depending on a running condition of the vehicle such as an opening degree of accelerator, a drive demand, a vehicle speed, a state of charge (abbreviated as SOC hereinafter) of electric storage device and so on. For example, the HV mode is selected when an opening degree of the accelerator is relatively large to keep the vehicle running at relatively high speed. To the contrary, if the SOC is sufficient and the opening degree of the accelerator is relatively small, the normal EV mode is selected to drive the vehicle while keeping the engine 1 in a condition ready to be restarted as necessary. Provided that the vehicle is allowed to be driven under the EV mode, the disconnecting EV mode is selected if it is necessary to reduce a power loss resulting from rotating the engine 1 concurrently.

Here will be explained an operating state of the hybrid drive unit under each driving mode. FIG. 9 is a nomographic diagram of the power distribution device 3. In FIG. 9, each vertical line individually represents the sun gear 4, the carrier 7 and the ring gear 5, and clearances between the sun gear 4 and the carrier 7 and between the carrier 7 and the ring gear 5 are individually determined in accordance with a gear ratio of the planetary gear unit serving as the power distribution device 3. In addition, the vertical direction represents a rotational direction, and a rotational speed is represented at a vertical position. In FIG. 9, the diagonal line as indicated "Disconnecting EV" represents an operating state under the disconnecting EV mode. Under the disconnecting EV mode, the second motor-generator 13 is used as a motor to drive the vehicle. In this situation, the engine 1 is stopped and disconnected from the power train 10 by disengaging the clutch K0, and the first motor-generator 11 is also stopped. Therefore, the sun gear 4 is not rotated, the ring gear 5 is rotated together with the output gear 12 in the forward direction, and the carrier 7 is rotated in the forward direction at a speed reduced in accordance with the gear ratio of the power distribution device 3.

In FIG. 9, the diagonal line as indicated "Normal EV" represents an operating state under the normal EV mode. Under the normal EV mode, the vehicle is driven by the power of the second motor-generator 13, and the engine 1 is stopped. In this situation, therefore, the carrier 7 is stopped, the ring gear 5 is rotated in the forward direction, and the sun gear 4 is rotated in the backward direction. In turn, the diagonal line as indicated "HV" represents an operating state under the HV mode. Under the HV mode, the clutch K0 is engaged and the engine 1 generates the driving force so that the carrier 7 is rotated by the torque in the forward direction. In this situation, a counter torque is applied to the sun gear 4 by operating the first motor-generator 11 as a generator. Consequently, a torque to rotate in the forward direction will appear on the ring gear 5. In this case, the electric power generated by the first motor-generator 11 is delivered to the second motor-generator 13. Therefore, the second motor-generator 13 is driven as a motor and a driving force thereof is transmitted to the output gear 12. Thus, under the HV mode, the power of the engine 1 is partially transmitted to the output gear 12 through the power distribution device 3. The remaining power of the engine 1 is converted into an electric power by the first motor-generator 11 and delivered to the second motor-generator 13. Then, the electric power thus delivered to the second motor-generator 13 is converted into a mechanical power again and delivered to the output gear 12. Such energy regeneration is carried out irrespective of selected driving mode by operating any one of the motor-generators 11 and 13 as a generator, under the situation that the prime mover 22 is not required to output the driving force aggressively.

Thus, in the hybrid vehicle to which the control system of the present disclosure is applied, the clutch K0 is selectively engaged depending on the driving mode. As described, if the friction surface of the clutch is partially moistened, the friction coefficient of the friction surface at the moistened portion is degraded in comparison with that at the remaining portion. Likewise, if the friction surface of the clutch is get rusted, the friction coefficient thereof is also degraded. In order to avoid such a disadvantage, the vehicle control system of the present disclosure is configured to carry out the following controls. Refereeing now to FIG. 1, a example for controlling the clutch by the vehicle control system of the present disclosure is shown. The control example shown in FIG. 1 is carried out repeatedly at predetermined intervals as long as the main switch of the hybrid vehicle is turned on. Instead, the routine shown in FIG. 1 may also be carried out only when a predetermined condition is satisfied. In this case, the routine shown in FIG. 1 is basically carried out under the condition that the main switch is turned on but the engine 1 is not activated. Under such condition, for example, the routine shown in FIG. 1 may be carried out based on a fact that a travel distance of the vehicle exceeds a predetermined distance, a fact that a parking time of the vehicle exceeds a predetermined time, a fact that an ambient temperature is lower than a predetermined criterion value and so on.

First of all, it is determined whether or not the main switch is turned on and the engine 1 is started (at step S1). That is, at step S1, it is determined whether or not the clutch K0 has ever been engaged since the main switch was turned on. The vehicle control system of the present disclosure is configured to determine that the engine 1 is started even in the course of cranking the engine 1 by the first motor-generator 11 while engaging the clutch K0. In case of thus cranking the engine 1, the answer of step S1 will also be YES even if a rotational speed of the engine 1 has not yet reached an ignition speed so that the fuel has not yet been delivered to the engine 1 and the engine 1 has not yet been ignited. If the engine 1 is in operation or has already been started, or the cranking of the engine 1 is being carried out so that the answer of step S1 is YES, the routine is returned without carrying out any specific control. To the contrary, if the main switch is turned on but the engine 1 is not started, that is, if the clutch K0 has not yet been engaged since the main switch was turned on, the answer of step S1 will be NO. For example, the answer of step S1 will be NO in case the main switch has already been turned on but the vehicle is still parking or not yet started, or in case the engine 1 has not yet been started under the situation that the vehicle is driven under disconnecting EV mode. Such determination of step S1 may be made based on a fact that a command signal to activate the engine 1 has been outputted from the E/G-ECU 21, or a fact that a command signal to engage the clutch K0 has been outputted from the HV-ECU 23.

If the answer of step S1 is NO, a clutch slip control is carried out in a manner not to start the engine 1 (at step S2). As described, the clutch K0 is engaged by the returning device, and torque transmitting capacity thereof is varied in accordance with a stroke of the hydraulic actuator. Therefore, at step S2, the clutch K0 is caused to slip by actuating the clutch K0 by the hydraulic actuator while applying a torque of the first motor-generator 11 to the clutch K0. Such slip of the clutch K0 can be induced by increasing a stroke of the hydraulic actuator. In this situation, a load on the first motor-generator 11 can be lightened by adjusting the stroke of the hydraulic actuator in a manner not to increase the torque transmitting capacity of the clutch K0 excessively. When the clutch K0 is thus engaged while causing a slip, the torque of the first motor-generator 11 is partially transmitted to the engine 1 thereby rotating the engine 1. However, the vehicle control system of the present disclosure is configured to prevent the engine 1 from being started at step S2. Specifically, a fuel delivery to the engine 1 and an ignition of the engine 1 are inhibited at step S2. In addition, the rotational speed of the engine 1 will not be increased excessively by the torque of the first motor-generator 11 by thus suppressing an increase in the torque transmitting capacity of the clutch K0. Here, step S2 will be carried out to cause a slip engagement of the clutch K0 irrespective of whether the vehicle is stopped or driven after the main switch was turned on. After thus carrying out the clutch slip control of step S2, the routine is returned.

Thus, if the engine 1 has not yet been started since the main switch was turned on, the slip control of the clutch K0 is carried out in a manner not to start the engine 1. Therefore, before starting the engine 1, the moisture on the friction surface of the clutch K0 can be evaporated by a friction heat generated between the frictional surfaces of the clutch K0. In addition, the rust on the friction surface of the clutch K0 can also be eliminated by a friction between the friction surfaces. As a result, the clutch K0 is allowed to be engaged without causing the clutch judder when starting the engine 1. As described, the dry-type clutch may be employed as the clutch K0, and the dry-type clutch is basically exposed on the outside of the vehicle. Therefore, a dew condensation may occur during parking the vehicle and this may cause so-called a "morning judder" when starting the vehicle. However, such morning judder can be prevented by carrying out the control shown in FIG. 2 on the occasion of starting the engine 1.

As described, the friction coefficient between the friction surfaces of the clutch K0 would be degraded if the friction surface is moistened or get rusted. In those cases, the vehicle control system of the present disclosure repeats the above-explained clutch slip control of step S2 to eliminate the moisture and the rust from the friction surface, until the friction coefficient between the friction surfaces is recovered to the desired value. Referring now to FIG. 2, there is shown a control example for repeating the clutch slip control at step S2 while estimating a friction coefficient between the friction surfaces of the clutch K0. As the routine shown in FIG. 1, the routine shown in FIG. 2 is also carried out repeatedly at predetermined intervals.

According to the control shown in FIG. 2, first of all, the above-explained step S1 is also carried out to determine whether or not the main switch is turned on and the engine 1 is activated. If the engine 1 is activated although the main switch is turned on so that the answer of step S1 is NO, an after-mentioned flag indicating a high probability of occurrence of the clutch judder is turned on (at step S3). After or simultaneously with carrying out the control of step S3, the above-explained slip engagement of the clutch K0 is carried out in a manner not to start the engine 1 (at step S2). Then, friction coefficient between the friction surfaces of the clutch K0 is estimated based on the torque transmitting capacity of the clutch K0 toward the engine 1 side with respect to the torque or rotational speed of the first motor-generator 11 (at step S4). An example of calculating the torque transmitting capacity of the clutch K0 will be explained hereinafter. For example, in case of starting the engine 1, the clutch K0 is engaged and the rotational speed of the engine 1 is raised to the target ignition speed by the first motor-generator 11. Referring now to FIG. 3, there is shown a nomographic diagram indicating a situation of raising a rotational speed of the engine 1 by the first motor-generator 11 under the aforementioned disconnecting EV mode.

Provided that the clutch K0 is disengaged, a torque is not applied to the first motor-generator 11 so that the first motor-generator 11 is stopped by a cogging torque. Then, when the clutch K0 starts being engaged, that is, starts transmitting the torque, the torque is applied to the first motor-generator 11 in the direction to rotate the first motor-generator 11 in the backward direction. In this situation, when the first motor-generator 11 outputs a torque in the forward direction, the clutch K0 is caused to slip and the rotational speed of the first motor-generator 11 is raised in a predetermined amount of $\Delta N_{mg1}$. Consequently, the torque is applied to the engine 1 in accordance with the torque transmitting capacity of the clutch K0 so that the rotational speed of the engine 1 is raised. In this situation, the clutch torque $T_{clutch}$ of the clutch K0 in accordance with a stroke thereof, that is, the torque transmitting capacity of the clutch K0 can be expressed by the following expression:

$$T_{clutch} = T_{mg1} \cdot G_{mg1} - I_{mg1} \cdot \Delta N_{mg1} \cdot G_{mg1} - I_{clutch} \cdot \Delta N_{clutch}.$$

In the above expression, $T_{mg1}$ is the torque of the first motor-generator 11 that can be calculated based on a current value, $I_{mg1}$ is an inertia moment of the first motor-generator 11 determined in advance, $\Delta N_{mg1}$ is a change rate of rotational speed (i.e., an angular acceleration) of the first motor-generator 11 that can be obtained based on e.g., a rotational speed detected by a (not shown) resolver arranged in the first motor-generator 11, $G_{mg1}$ is a gear ratio between the first motor-generator 11 and the clutch K0, $I_{clutch}$ is an inertia moment of a rotary member of the clutch K0 of the first motor-generator 11 side and rotary members rotated therewith such as the input shaft 8 and the carrier 7, and $\Delta N_{clutch}$ is a change rate of rotational speed (i.e., an angular acceleration) of the rotary member of the clutch K0 of the first motor-generator 11 side and rotary members rotated therewith such as the input shaft 8 and the carrier 7.

When the clutch K0 is engaged at a predetermined stroke in a manner to cause a slip, the rotational speed of the rotary member of the clutch K0 of the first motor-generator 11 side is changed, and the torque transmitted through the slipping clutch K0 is wasted in accordance with the inertia moment and the change rate of the rotational speed of the rotary member of the clutch K0 of the first motor-generator 11 side. Accordingly, the torque transmitting capacity of the clutch K0 can be calculated by subtracting an amount of the wasted torque from the output torque of the first motor-generator 11.

As described, in some embodiments, the conventional single plate-type dry clutch is employed as the clutch K0. When the stroke of the clutch K0 is zero or shorter than a predetermined distance, the clutch K0 is engaged completely by the diaphragm spring serving as the returning device. The pushing force of the returning device is diminished gradually as the stroke of the clutch K0 increases so that the clutch K0 starts slipping. In this situation, the torque transmitting capacity of the clutch K0, that is, the clutch torque $T_{clutch}$ is reduced gradually, and the clutch K0 is eventually disengaged completely. Specifically, the torque transmitting capacity of the clutch K0 as the friction clutch is governed by the friction coefficient between the friction members, a diametrical position of the friction member, number of the friction members on the plate, pushing force of the returning device (i.e., a contact pressure between the friction members) and so on. Therefore, a relation between the torque transmitting capacity of the clutch K0 (i.e., the clutch torque $T_{clutch}$) and a control amount of the clutch K0 (i.e., a stroke of the clutch K0 or a hydraulic pressure applied to the clutch K0) can be preinstalled in the form of a map shown in FIG. 4. Hereinafter, such relation will simply be called a relation between the clutch torque $T_{clutch}$ and the stroke of the clutch K0 for the sake of convenience. In FIG. 4, the vertical axis represents the clutch torque $T_{clutch}$, and the horizontal axis represents the stroke of the clutch K0 or the hydraulic pressure applied to the clutch K0. That is, the diagonal solid line represents the relation between the clutch torque $T_{clutch}$ and the stroke of the clutch K0 (or a hydraulic pressure applied to the clutch K0) before corrected. The diagonal solid line is corrected based on the calculated current value of the clutch torque $T_{clutch}$ as indicated by the broken line. This means that the relation between the clutch torque $T_{clutch}$ and the stroke of the clutch K0 is corrected taking into consideration the degradation in the friction coefficient of the clutch K0 resulting from deterioration in the pushing force of the returning device, abrasion of the members relating to an engagement of the clutch K0, moisture of the friction surface, rust on the friction surface etc. Therefore, at step S4 of FIG. 2, the current friction coefficient of the clutch K0 is estimated based on the corrected torque transmitting capacity of the clutch K0 with respect to the current stroke of the clutch K0.

Then, it is determined whether or not the friction coefficient of the clutch K0 thus estimated at step S4 is equal to or larger than a predetermined threshold value (at step S5). Specifically, the threshold used in the determination at step S5 is a criterion value of the friction coefficient of the clutch K0 determined in advance, and if the friction coefficient of the clutch K0 thus estimated at step S4 is smaller than the threshold value, the vehicle control system determines that the clutch judder may occur if the clutch K0 is engaged. In this case, therefore, the answer of step S5 is NO and the routine is returned to step S2 to repeat the clutch slip control. In contrast, if the friction coefficient of the clutch K0 estimated at step S4 is equal to or larger than the threshold value, the vehicle control system determines that the clutch judder may not occur even if the clutch K0 is engaged. In this case, therefore, the answer of step S5 is YES and the routine advances to step S6 to turn off the flag indicating a high probability of occurrence of the clutch judder. The routine is then returned.

Next, here will be explained an example of the control to determine how to engage the clutch K0 when starting the engine 1 under the condition that the estimated friction coefficient of the clutch K0 is smaller than the threshold value, with reference to FIG. 5. As the foregoing control examples, the routine shown in FIG. 5 is also repeated at predetermined intervals. First of all, it is determined whether or not the engine 1 is demanded to be started (at step S7). For example, the answer of step S7 will be NO in case the normal or disconnecting EV mode is selected, or in case the SOC of the electric storage device is sufficient. In this case, the determination of step S7 will be repeated until the engine 1 is demanded to be started. To the contrary, in case a large driving force is demanded so that the driving mode is shifted from the normal or disconnecting EV mode to the HV mode, or in case the SOC is lowered to the lower limit value, the vehicle control system determines that the engine 1 is demanded to be started so that the answer of step S7 will be YES.

When starting the engine 1, the output torque of the engine 1 is allowed to be transmitted promptly to the driving wheels 2 by starting the engine 1 while gradually increasing the engagement pressure of the clutch K0. Therefore, if the answer of step S7 is YES, it is determined whether or not the engine 1 is demanded to be started while causing the clutch K0 to slip (at step S8). In other words, at step S8, it is determined whether or not so-called a "concurrent start" of the engine 1 is required to be carried out. Such determination of step S8 can be made based on the command signal of the HV-ECU 23 sent to the clutch K0. Specifically, if the command signal to engage the clutch K0 while causing a slip is sent to the clutch K0, the answer of step S8 will be YES. In this case, the engine 1 is rotated by the torque of the first motor-generator 11 transmitted through the clutch K0 being engaged while causing a slip, and when the rotational speed of the engine 1 is raised to the ignition speed, an ignition of the engine 1 is carried out while delivering the fuel thereto (at step S9).

In contrast, if the command signal to engage the clutch K0 while causing a slip is not sent to the clutch K0 from the HV-ECU 23 so that the answer of step S8 is NO, the routine advances to the above-explained step S1. In this case, the control similar to that carried out at the above-explained step S1 of the example shown in FIG. 1 is carried out. Specifically, at step S1, it is determined whether or not the main switch is turned on and the engine 1 is activated. If the engine 1 is in operation or has already been started so that the answer of step S1 is YES, this means that the clutch slip control has already been carried out. In this case, therefore, it is considered that the moisture or rust on the friction surface of the clutch K0 has already been eliminated so that the routine is returned without carrying out any specific control. Thus, if the answer of step s1 is YES, the clutch slip control will not be repeated unnecessarily to prevent the clutch K0 from being worn out.

In contrast, if the answer of step S1 is NO, it is determined whether or not the clutch judder may occur if the clutch K0 is engaged (at step S10). Such determination of step S10 can be made based on the above-explained flag indicating a high probability of occurrence of the clutch judder. Specifically, if the flag is turned off so that the answer of step S10 is NO, the engine 1 is started while causing the clutch K0 to slip (at step S9). Then, the routine is returned. To the contrary, if the flag is turned on so that the answer of step S10 is YES, it is considered that the clutch judder may occur if the clutch K0 is engaged. In this case, therefore, the clutch K0 is engaged while synchronizing the input speed of the clutch K0 with the rotational speed of the output side of the clutch K0, and then, the engine 1 is started (at step S11). Specifically, the rotational speed of the carrier 7 is reduced to zero by adjusting the rotational speed of the first motor-generator 11, and then the clutch K0 is engaged completely to maximize the torque transmitting capacity at once. In this situation, a cranking of the engine 1 is carried out by the torque of the first motor-generator 11, and when the rotational speed of the engine 1 is raised to the ignition speed, the fuel is delivered to the engine 1 and an ignition of the engine 1 is carried out. That is, so-called a "sequential start" is carried out at step S11, and then the routine is returned.

Thus, according to the present disclosure, the friction coefficient of the clutch K0 is estimated based on the torque transmitting capacity thereof with respect to the torque of the first motor-generator 11, and the above-explained sequential start of the engine 1 is carried out under the condition that the clutch judder is expected to occur. Therefore, the clutch judder will not occur when starting the engine 1 while engaging the clutch K0 so that the NVH characteristics will not be deteriorated.

Thus, if the friction coefficient of the clutch K0 is smaller than the threshold value, the sequential start of the engine 1 is carried out. In this case, if the vehicle is running at high speed, the rotational speed of the carrier 7 has to be reduced significantly to zero by rotating the first motor-generator 11 backwardly. Therefore, it may take long time to engage the clutch K0. In addition, as a result of thus reducing the rotational speed of the carrier 7 to zero, a rotational speed of the pinion gear 6 will be raised excessively thereby deteriorating durability of the pinion gear 6. Further, if a large driving force is demanded, the rotational speed of the engine 1 is raised by the first motor-generator 11 to a driving point to achieve the demanded driving force. To this end, the rotational speed of the first motor-generator 11 thus increased in the negative direction to achieve a synchronous engagement of the clutch K0 is then raised from the negative speed to the speed required to achieve the demanded driving force. That is, the rotational speed of the first motor-generator 11 has to be raised over a long range, and a torque transmission will be interrupted during raising the speed of the first motor-generator 11. In this situation, therefore, it may take long time to transmit the torque of the engine 1 to the driving wheels 2, in other words, the acceleration response may be degraded.

In order to avoid such a disadvantage, the vehicle control system of the present disclosure is configured to carry out a control for inhibiting the disconnecting EV mode in case a large driving force or high vehicle speed is demanded under the situation that the clutch judder is expected to occur. An example of such control will be explained with reference to FIG. 6. As the foregoing control examples, the routine shown in FIG. 6 is also carried out repeatedly at predetermined intervals. First of all, as the routines shown in FIGS. 1 and 2, it is determined whether or not the main switch is turned on and the engine 1 is started (at step S1). If the answer of step S1 is YES, the routine is returned without carrying out any specific control. To the contrary, if the answer of step S1 is NO, it is determined whether or not the clutch judder may occur if the clutch K0 is engaged (at step S10). If the above-explained flag is turned off so that the answer of step S10 is NO, the routine returned.

To the contrary, if the flag is turned on so that the answer of step S10 is YES, the routine advances to step S12. Specifically, at step S12, threshold values of the drive demand and the vehicle speed forming a border to carry out a shifting between the disconnecting EV mode and the HV mode are set to lower values, in a manner not deteriorate the acceleration response, required time to engage the clutch K0, durability of the pinion gear 6 and so on.

Consequently, the border to carry out a shifting between the disconnecting EV mode and the HV mode is altered in a manner such that the driving mode is hardly shifted to the disconnecting EV mode. That is, a region of the drive demand and the vehicle speed where the disconnecting EV mode is selected is restricted. In this case, therefore, the vehicle is allowed to be driven while engaging the clutch K0 in most situations so that the acceleration response of the vehicle can be improved. That is, the driving mode is shifted from the disconnecting EV mode to the HV mode at lower speed. Therefore, the pinion gear 6 is prevented from being rotated at excessively high speed so that the durability of the pinion gear 6 will not be deteriorated. In addition, an easiness to control the clutch K0 will not be deteriorated even when shifting the driving mode from the disconnecting EV mode to the HV mode. Therefore, the acceleration response of the vehicle is prevented from being deteriorated. Here, in the foregoing explanation, the control example shown in FIG. 6 was carried out under the situation where the driving mode is shifted from the disconnecting EV mode to the HV mode. However, the control example shown in FIG. 6 may also be carried out when shifting the driving mode from the disconnecting EV mode to the normal EV mode.

The invention claimed is:

1. A vehicle control system, which is applied to a vehicle comprised of an engine, a motor disposed on a power train, and a clutch for selectively connecting the engine with the power train that is adapted to cause a slip when engaged,
wherein the vehicle control system is configured to engage the clutch while causing a slip but without starting the engine provided that the engine is not activated,
wherein the vehicle control system is configured to estimate a friction coefficient of the clutch when increasing a rotational speed of the engine by a torque of the motor transmitted thereto through the clutch being engaged while causing a slip
by estimating a torque transmitting capacity of the clutch being engaged while causing a slip based on:
an output torque of the motor, and
each change rate of rotational speed of the motor and rotational speed inputted to the clutch from the motor changed as a result of engaging the clutch while causing a slip, and
by estimating the friction coefficient of the clutch based on the estimated value of the torque transmitting capacity of the clutch, and a control amount of the clutch to engage the clutch while causing a slip.

2. The vehicle control system as claimed in claim 1,
wherein the vehicle control system is configured to engage the clutch while causing a slip but without starting the engine provided that the vehicle is driven by a torque of an output torque of the motor and the engine is not activated.

3. The vehicle control system as claimed in claim 1,
wherein the vehicle control system is configured to engage the clutch while causing a slip but without starting the engine provided that a friction coefficient of the clutch is smaller than a predetermined value and the engine is not activated.

4. The vehicle control system as claimed in claim 1,
wherein the control system is configured to select an electric vehicle mode in which the vehicle is driven by a torque of the motor while disengaging the clutch in case a vehicle speed and a demanded driving force are smaller than predetermined threshold values, and
wherein the control system is configured to lower a threshold value of the vehicle speed and a threshold value of the demanded driving force in case the friction coefficient of the clutch is equal to or smaller than the predetermined value thereby altering a border to shift a driving mode of the vehicle to the electric vehicle mode.

5. A vehicle control system for a vehicle, comprising
an engine;
a motor disposed on a power train;
a clutch that selectively connects the engine with the power train, the clutch is adapted to cause a slip when engaged; and
an electronic control unit that is operatively connected to the clutch and the engine, the electronic control unit configured to control the clutch to engage while causing a slip but without starting the engine provided that the engine is not activated,
estimate a friction coefficient of the clutch when increasing a rotational speed of the engine by a torque of the motor transmitted thereto through the clutch being engaged while causing a slip,
estimate a torque transmitting capacity of the clutch being engaged while causing a slip based on: an output torque of the motor, and each change rate of rotational speed of the motor and rotational speed inputted to the clutch from the motor changed as a result of engaging the clutch while causing a slip, and
estimate the friction coefficient of the clutch based on the estimated value of the torque transmitting capacity of the clutch, and a control amount of the clutch to engage the clutch while causing a slip.

6. The vehicle control system as claimed in claim 5,
wherein the electronic control unit is configured to control the clutch to engage while causing a slip but without starting the engine provided that the vehicle is driven by a torque of an output torque of the motor and the engine is not activated.

7. The vehicle control system as claimed in claim 5,
wherein the electronic control unit is configured to control the clutch to engage while causing a slip but without starting the engine provided that a friction coefficient of the clutch is smaller than a predetermined value and the engine is not activated.

8. The vehicle control system as claimed in claim 5,
wherein the electronic control unit is configured to select an electric vehicle mode in which the vehicle is driven by a torque of the motor while disengaging the clutch in case a vehicle speed and a demanded driving force are smaller than predetermined threshold values, and
wherein the electronic control unit is configured to lower a threshold value of the vehicle speed and a threshold value of the demanded driving force when the friction coefficient of the clutch is equal to or smaller than the predetermined value thereby altering a border to shift a driving mode of the vehicle to the electric vehicle mode.

9. A vehicle control system, which is applied to a vehicle comprised of an engine, a motor disposed on a power train, and a clutch for selectively connecting the engine with the power train that is adapted to cause a slip when engaged,
wherein the vehicle control system is configured to engage the clutch while causing a slip but without starting the engine provided that the engine is not activated,
wherein the control system is configured to select an electric vehicle mode in which the vehicle is driven by a torque of the motor while disengaging the clutch in case a vehicle speed and a demanded driving force are smaller than predetermined threshold values, and
wherein the control system is configured to lower a threshold value of the vehicle speed and a threshold value of the demanded driving force in case the friction coefficient of the clutch is equal to or smaller than the predetermined value thereby altering a border to shift a driving mode of the vehicle to the electric vehicle mode.

* * * * *